United States Patent Office.

JOHN CA FLISCH, OF UNION MILLS, PENNSYLVANIA.

Letters Patent No. 62,936, dated March 19, 1867.

IMPROVED COMPOSITION FOR ROOFING, COVERING WOOD, &c.

The Schedule referred to in these Letters Patent and making part of the same.

TO ALL WHOM IT MAY CONCERN:

Be it known that I, JOHN CA FLISCH, of the town of Unionmills, in the county of Erie, and State of Pennsylvania, have made a new and useful Composition of Matter, or Weather-Proof Coating for covering Wood, Pasteboard, and Metal; and I do hereby declare that the following is a full, clear, and exact description of the same.

The nature of my invention consists, first, in the application of lime to coal tar, while the lime is being slaked, in order that the coal tar may exhaust its moisture without being exposed to a great heat, by means of which its property of tenacity or toughness is retained, and whereby a composition of matter is had, the bulk of which can be considerably increased without destroying its tenacity by matters separating the same, and whereby a more durable and weather-proof coating is obtained with less expense than those heretofore known or used; second, it consists in combining with coal tar and lime, sand, quicksand, or clay, whereby a weather-proof coating is obtained of considerable bulk, and of more durability, and with less cost than those now used or known.

To enable others skilled in the art to make and use my invention, I will proceed to describe its construction and operation.

In order to produce my compounds, I first take and heat a quantity of coal tar to about 120° to 160° Fahrenheit. I then take a quantity of lime, and pulverize the same, and start it to slackening by pouring a small quantity of water on it. I now proceed and cast the coal tar into the lime, and mix and stir both well and continuously until the lime becomes saturated with the tar, and the desired density of the composition is obtained. As soon as the composition becomes cooled, the water or moisture not already evaporated will then separate from the compound and is disposed of, and the composition is in the proper state to apply. It may now be used as a paint body, and may be mixed with oils or varnishes in the common way, which will decrease its density; or it may be mixed with sand, quicksand, or clay to increase the density, and used for coating roofs and other similar purposes. When used, it is laid on cold, and will thoroughly harden when exposed to the atmosphere a short time. In order to increase the bulk, and obtain the desired density to produce a durable weather-proof coating for roofs, I add nearly one-half the bulk of sand to the coal tar and lime; and for certain applications it is preferable to substitute for the sand a greater or less portion of quicksand or clay, or substitute the quicksand or clay entirely for the sand. Instead of using entirely coal tar, petroleum tar may be wholly or in part substituted.

From the foregoing it will be seen that the cost of the ingredients, and of the manufacture of this composition coating, is very small, while its durability greatly surpasses those heretofore produced.

What I claim as my invention, and desire to secure by Letters Patent, is—

1. The combination of lime with coal tar, in the manner substantially as and for the purpose herein shown.

2. The composition of coal tar, sand, quicksand, or clay, and lime, substantially as and for the purpose herein described.

JOHN CA FLISCH.

Witnesses:
  THO. SADLER,
  W. W. EGBERT.